United States Patent [19]

Warren

[11] 3,828,996

[45] Aug. 13, 1974

[54] RECORD WEB CONTROL AND DRIVE APPARATUS

[75] Inventor: Henry Ray Warren, Indianapolis, Ind.

[73] Assignee: RCA Corporation, New York, N.Y.

[22] Filed: June 13, 1973

[21] Appl. No.: 369,736

Related U.S. Application Data

[63] Continuation of Ser. No. 200,011, Nov. 18, 1971.

[30] Foreign Application Priority Data

Apr. 5, 1971 Great Britain .................... 8684/71

[52] U.S. Cl. ................................ 226/168, 226/198

[51] Int. Cl. ........................................ B65h 17/20

[58] Field of Search ............ 226/34, 168, 176, 177, 226/183, 190, 198

[56] References Cited

UNITED STATES PATENTS

| | | | |
|---|---|---|---|
| 3,289,906 | 12/1966 | Schuller | 226/168 |
| 3,424,360 | 1/1969 | Trott | 226/168 |
| 3,542,303 | 11/1970 | Auld | 226/183 X |

*Primary Examiner*—Richard A. Schacher
*Attorney, Agent, or Firm*—Eugene M. Whitacre

[57] ABSTRACT

A means for effecting improved web advancing cooperation between a capstan and a recording web is disclosed. The peripheral surface of a rotating capstan which is to contact one side of a web is covered with a high coefficient of friction material. A member at the opposite side of the web, having a low coefficient of friction surface and which is stationary with respect to the direction of web motion, urges the web into motion imparting engagement with the capstan surface.

9 Claims, 6 Drawing Figures

Figures 1, 2A, 2B:
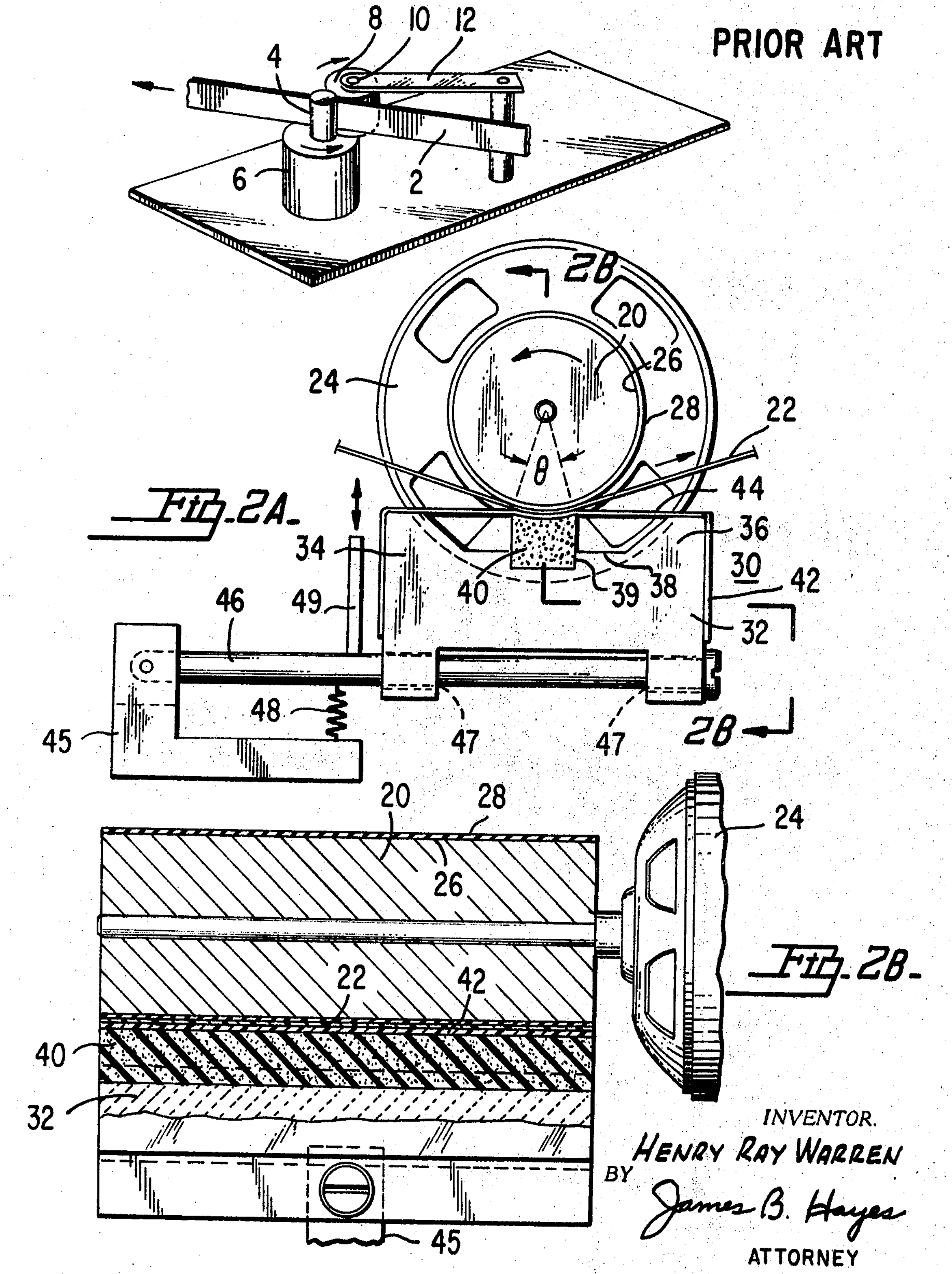

INVENTOR.
HENRY RAY WARREN
BY James B. Hayes
ATTORNEY

PATENTED AUG 13 1974

3,828,996

SHEET 2 OF 2

INVENTOR.
HENRY RAY WARREN
BY
James B. Hayes
ATTORNEY

RECORD WEB CONTROL AND DRIVE APPARATUS

This is a continuation of application Ser. No. 200,011, filed Nov. 18, 1971.

This invention relates to an improved and economical arrangement for driving and controlling a recording web in a recorder-reproducer system. More particularly there is disclosed a novel manner of effecting web advancing cooperation between a capstan means and an elongated recording web.

In typical recorder-reproducer systems, and in particular video recording and playback systems, a large volume of information must be transduced per unit of time. To minimize the amount of web or recording medium such as magnetic tape, required, the recorded information is distributed longitudinally along the tape as well as transversely across the tape. It is necessary to provide precise control of the tape which travels at appreciable velocity past a signal transducer. Even small variations in the traveling velocity of the tape produce distortion of the signals by unwanted modulation. Also slight departure of the tape from the desired predetermined path may result in phase errors and serious signal distortion.

In existing recorder-reproducer systems for driving a recording tape, it is common practice to hold the tape firmly against a driven capstan by means of a pinch roller which is thereby rotated by the capstan. The cylindrical capstan is usually formed of metal or some similar unyielding material. The cylindrical pinch roller is usually formed of rubber or similar material which is pliable. It is difficult and not always economically feasible, to provide a rotatable pinch roller having exact geometry and precise rotation. Variations of size along and/or about the pinch roller, eccentricity of rotation about its axis, and non-homogeneity of the roller material can result in an undesirable change in the longitudinal speed and/or direction of the travel of the recording tape.

Existing approaches to coping with these problems have included providing a rotatable metal pinch roller and a pliable capstan. However, the rotatable pinch roller must still be provided with exacting and costly precision. The precision cost factor is particularly important in for example cartridge player systems, where the means for urging the tape against the capstan forms a part of the cartridge. The cartridges for such systems being interchangeable must be manufactured in extremely high numbers and at a minimal cost. It is therefore highly desirable to provide whatever precision cost is necessary in the player system proper and eliminate such items from the cartridge.

With the arrangement of the present invention, the discussed problems associated with rotatable pinch roller tape drives are avoided. In addition, the disclosed tape drive arrangement can be simply and economically implemented. Briefly, a coating of a first material is disposed on and affixed to the peripheral surface of capstan means adapted to cooperate with a first side of a recording web. The coating material has a given coefficient of friction for producing between said capstan means and said first side of said recording web a high value friction force upon contact therebetween. Guide means including a surface adapted to cooperate with the side of the recording web opposite the first side are provided. The guide surface exhibits a coefficient of friction which is substantially less than the given coefficient of friction of the capstan surface. This produces between the guide surface and the opposite recording web side a low value friction force upon contact therebetween. Means are provided for supporting the guide means in a manner to cause the guide surface to urge the first web side into cooperative relation with the capstan means. The urging force is made sufficient to produce advancement of the web between the peripheral capstan surface and the guide surface when the capstan means is rotated.

FIG. 1 is a perspective view of a typical prior arrangement for driving a recording web.

FIGS. 2(a) and (b) are a plan view and a sectioned view respectively of a first embodiment of the invention.

Figures 3A, 3B:
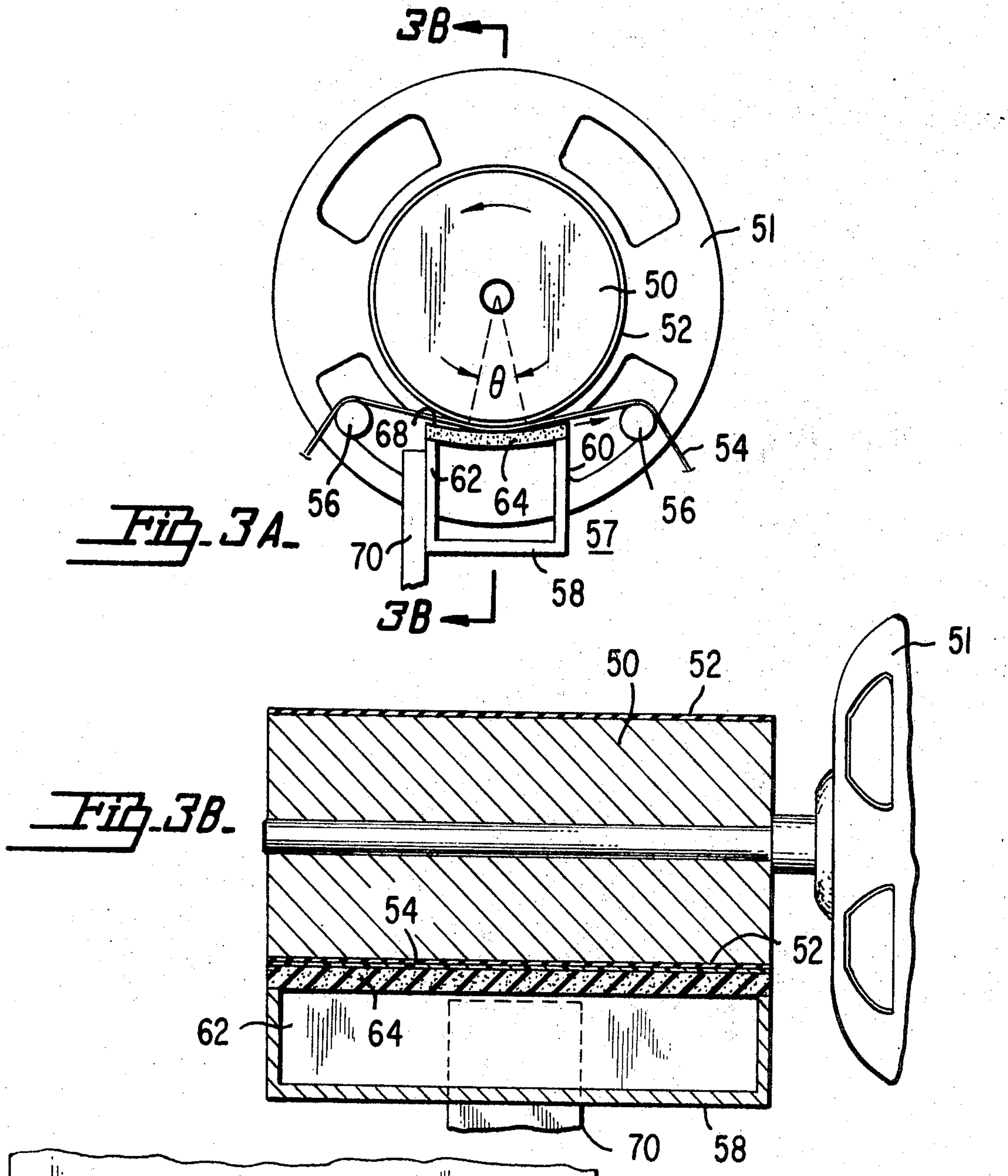

FIGS. 3(a) and (b) are a plan view and a sectioned view of a further embodiment of the invention.

Figure 4:
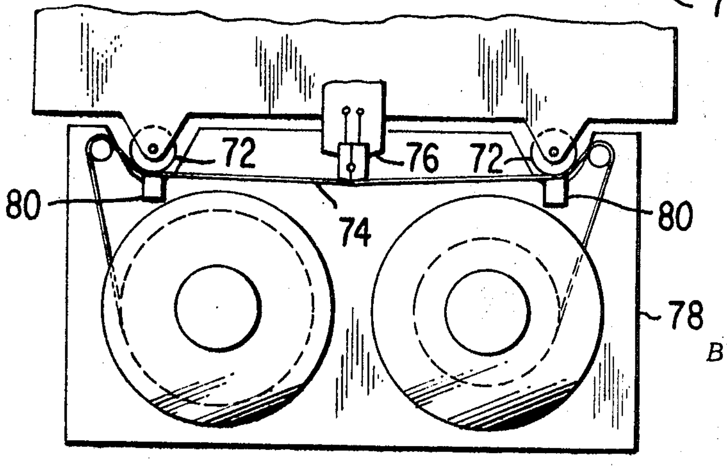

FIG. 4 is a plan view of one arrangement of a cartridge recorder-reproducer system embodying the invention.

In FIG. 1 there is shown an arrangement used in the prior art for driving a recording web by means of a combination of capstan and a rotatable roller. In FIG. 1 motion is imparted to the recording medium or tape 2 by means of a capstan 4 which is rotatably driven by a motor 6. A rotatable pinch roller 8, which is formed of a pliable material such as rubber, is rotatable about an axis 10. The rotatable pinch roller 8 with its axis 10 is pivotally mounted by means of an arm 12. The rotatable pinch roller 8 is pivoted into contacting engagement with the rotating capstan 4. The rotating motion of the capstan 4 imparts rotation to the pinch roller 8 through their mutually engaged peripheral surfaces. The motion imparted by this means to the pinch roller 8 causes the tape 2 to be propelled in a longitudinal direction between the contra-rotating capstan 4 and pinch roller 8. As pointed out previously, such an arrangement presents problems in accomplishing the desired travel of the tape 2.

If reference is made to FIG. 2, there is shown one embodiment of the present invention for driving an elongated recording web or tape, which avoids the attendent problems of rotatable pinch rollers found in the prior art. In FIG. 2 a capstan means 20 is rotatably mounted, by suitable known means, at one side of an elongated recording web or tape 22. The capstan means 20 is secured to and driven by means such as the motor 24. The capstan 20 which for example is metal, includes a substantially cylindrical peripheral surface 26. On the peripheral surface 26 there is disposed a coating or cover 28 of a relatively high coefficient of friction material such as polyurethane, or a similar rubber like material. The material 28 for example may have a thickness in the range of 0.010–0.026 inches and a hardness of say 50–80 as measured on a Shore A Durometer scale. The coefficient of friction of the coating material 28 is for example in the range of 1.2–2.0, so as to produce a relatively high friction force between the coating 28 and the recording medium 22, which is usually formed of a plastic such as Mylar with a coating of a metallic oxide on the recording surface. On the opposite side of the medium 2 from the capstan 20, there is provided an assembly 30 which is non-rotatable or stationary with respect to the direction of tape motion, for urging the recording web 22 into frictional advancing relation with the high friction surface 28 of the capstan 20.

The assembly 30 includes a member 32 extending transverse to the direction of elongation of the medium 22. The member 32 includes projections 34, 36 extending in a direction towards the capstan 20 to form a channel 38 therebetween which includes a depression or slot 39. Disposed in the depression 39 of the channel 38 is a further member 40 formed of a compressible resilient material. The member 40 may for example be formed of a rubber material such as Silicon, Neoprene or sponge rubber or other similar material, having a hardness in the range of 20–90 as measured on a Shore A durometer scale. As shown, the member 40 has a width which is preferably comparable to the extent of wrap of the web 22 about the capstan 20 over the wrap angle $\theta$. A deformable piece or sheet of material 42 extends in bridging manner between the projection 34 and 36, and passes over and contacts the member 40 to form a bearing or guide surface 44. The element 42 is preferably secured to the members 32 and 40 by a suitable adhesive. Although not shown the members 40 and 42 may be provided as a single piece element of suitable described material. Since it is desirable that the surface 44 not be moveable or rotatable in the direction of movement of the medium 22 when engaged therewith, the material at the surface 44 is one which exhibits a coefficient of friction substantially less than that of the coating 28 on capstan 20. The sheet of material 42, for example, may be Teflon or of some other material which exhibits a coefficient of friction such as 0.1 or less. Therefore a relatively small value of friction force is produced between the surface 44 and the record medium 22. The element 42 with surface 44 thus provides a low coefficient of friction to the web 22 and inhibits displacement of the member 40 in the direction of motion of the web.

The assembly 30 is pivotally mounted to a support member 45 by means of a rod or arm 46. The rod 46 which is preferably round, passes through a pair of apertures 47 in the member 32, in a manner to permit movement of the assembly 30 about the rod 46 in a direction transverse to the direction of motion of the web 22. This provides self alignment of the assembly 30 with the capstan 20. A resilient means such as a compression spring 48 interposed between support 45 and the rod 46, urges the assembly 30 into cooperative relation with the web 22 and capstan 20. A bar 49 which is secured to the rod 46 provides a means of controlling the disposition of the assembly with respect to the web 22. The spring 48 is arranged to provide a normal urging force, for example, of 0.75–1.25 pounds, causing the low coefficient of friction surface 44, to establish the desired frictional relation between the medium 22 and the high coefficient of friction surface 28 for smooth advancement of the medium 22 therebetween. Since there is no motion of the assembly 30 in the direction of the movement of the medium 22, the problems discussed above regarding rotatable pinch rollers are not present with the arrangement of the present invention.

If reference is made to FIG. 3, there is shown a further embodiment in accordance with the present invention. In FIG. 3 there is provided a motor 51 driven capstan 50 having a peripheral coating 52 which exhibits a relatively high degree of friction with respect to the record medium 54. The record medium 54 is guided toward and away from the capstan 50 by means of guide members 56. Mounted at the opposite side of the recording web 54 but adjacent the capstan 50, is an assembly 57 for urging the web 54 into frictional engagement with the capstan 50. In the embodiment of FIG. 3, the assembly 57 includes a generally U-shaped spring member 58 having free end portions 60 and 62 extending towards the capstan 50. Bridging the free end portions 60 and 62 is a deformable member 64, including a surface 68 which exhibits a coefficient of friction 0.1 or less which is substantially less than that of the surface 52 of capstan 50. The surface 68 therefore provides minimal frictional force with the recording web 54 when in contact therewith. The member 64 is dimensioned to permit deformation thereof, to provide conforming of the surface 68 to the peripheral surface shape of the capstan 50 over the wrap angle $\theta$. The free end portion 62 of member 58 is mechanically grounded by securing it to a supporting member 70 in cantilevered manner. The supporting member 70 is oriented with respect to the capstan 50 to cause the member 58 with surface 68 to be biased towards the capstan 50, to thereby produce the desired friction engaging force between the recording web 54 and the capstan coating 52.

In FIG. 4 there is shown in simplified diagrammatic form, a recorder-reproducer system including a pair of rotatable capstan means for driving a recording web 74 past a signal transducer 76. The recorder-reproducer system of FIG. 4 is of the type, for transducing information with a recording medium disposed in a storage means such as a cartridge 78. The capstan means 72 include a peripheral coating which produces a relatively high frictional force when engaged with the record medium 74. Mounted in the cartridge 78 and forming a part thereof are a pair of guide members 80.

The guide means 80 are resiliently mounted, by means not shown, for urging the record medium 74 into frictional engagement with the respective capstan means 72. As previously described with respect to the embodiments of FIGS. 2 and 3, each of the guide means 80 have a medium engaging surface which exhibits a coefficient of friction with respect to the medium which is substantially less than that of the peripheral surface of the capstan means 72. Thus a simple and economical means is provided for effecting the transport of the medium past the signal transducer 76. The elimination of the rotatable pinch rollers with its attendant problems, minimizes the precision requirements of the interchangeable cartridges and permits inclusion of the desired degree of precision in a single instance in the recorder-reproducer system proper.

In practice of the invention the ratio of the friction coefficient of the high friction material to the low friction material is preferably 10 to 1 or greater, although ratios approaching unity are possible. The combination of a Teflon material with a friction coefficient less than 0.1, with a polyurethane capstan covering 0.020 inches thick having a hardness of approximately 55 (Shore A Durometer scale) and exhibiting a coefficient of friction of 1.5, has been found suitable for the invention. For a 0.25 inch diameter capstan with an approximately 25 degree wrap of 0.75 inch wide tape, the tape area contacted by the low and high friction materials is approximately 0.72 inches across the tape and 0.100 inches along the tape.

What is claimed is:

1. Apparatus for use with a system for transporting an elongated recording web including rotatable capstan means having a substantially cylindrical peripheral surface adapted to cooperate with a first side of said recording web, a covering of a first material disposed on and affixed to the peripheral surface of said capstan means, said first material having a given coefficient of friction for producing between said capstan means and said first side of said recording web a high value friction force upon contact therebetween, non-rotatable guide means stationary with respect to the direction of movement of said web and including a surface adapted to cooperate with the side of said recording web opposite said first side, said guide surface including a further material exhibiting a coefficient of friction which is less than said given coefficient of friction for producing between said guide surface and said opposite recording web side a low value friction force upon contact therebetween, comprising; means for supporting said guide means in a manner to cause said guide surface to urge said first web side into cooperative relation with said capstan means with a force sufficient to produce advancement of said web between said peripheral capstan surface and said guide surface when said capstan means is rotated, said guide means comprises first and second projections extending in a direction transversely across the width of said web to form a member with a generally U-shaped channel cross section, and a sheet of deformable material bridging said projections along said member to form said guide surface.

2. The invention according to claim 1, and further including compressible resilient material disposed in said channel, said material extending along and in contacting relation with said sheet to support said guide surface intermediate said projections.

3. The invention according to claim 1, wherein the coefficient of friction of said first material is at least five times greater than the coefficient of friction of said further material.

4. The invention according to claim 1, wherein said first material includes polyurethane having a thickness in the range of 0.010–0.026 inches, with a hardness in the range of 50–80 as measured on a Shore A Durometer scale, and wherein said first material exhibits a coefficient of friction in the range of 1.2–2.0, with said further material exhibiting a coefficient of friction less than 0.1.

5. Apparatus for transporting an elongated recording web comprising: rotatable capstan means having a substantially cylindrical peripheral surface adapted to cooperate with a first side of said recording web, a covering of a first material disposed on and affixed to the peripheral surface of said capstan means, said first material having a given coefficient of friction for producing between said capstan means and said first side of said recording web a high value friction force upon contact therebetween, non-rotatable guide means stationary with respect to the direction of movement of said web and including a surface adapted to cooperate with the side of said recording web opposite said first side, said guide surface including a further material exhibiting a coefficient of friction which is less than said given coefficient of friction for producing between said guide surface and said opposite recording web side a low value friction force upon contact therebetween, means for supporting said guide means in a manner to cause said guide surface to urge said first web side into cooperative relation with said capstan means with a force sufficient to produce advancement of said web between said peripheral capstan surface and said guide surface when said capstan means is rotated, a frame member, rod means pivotally mounted to said frame member for movement of said rod toward and away from said capstan means, means coupling said guide means to a portion of said rod opposite said capstan means in a manner to permit rotation of said guide means transverse of the direction of movement of said web, and spring means coupled to said rod means for biasing said guide means toward said capstan means.

6. Apparatus for use with a system for transporting an elongated recording web including rotatable capstan means having a substantially cylindrical peripheral surface adapted to cooperate with a first side of said recording web, a covering of a first material disposed on and affixed to the peripheral surface of said capstan means, said first material having a given coefficient of friction for producing between said capstan means and said first side of said recording web a high value friction force upon contact therebetween, non-rotatable guide means stationary with respect to the direction of movement of said web and including a surface adapted to cooperate with the side of said recording web opposite said first side, said guide surface including a further material exhibiting a coefficient of friction which is less than said given coefficient of friction for producing between said guide surface and said opposite recording web side a low value friction force upon contact therebetween, comprising; means for supporting said guide means in a manner to cause said guide surface to urge said first web side into cooperative relation with said capstan means with a force sufficient to produce advancement of said web between said peripheral capstan surface and said guide surface when said capstan means is rotated, said guide means comprises a member having first and second ends and an arcuate shape therebetween adapted to substantially conform with the shape of the peripheral surface of said capstan means, a generally U-shaped spring member having respective free end portions, with the first and second ends of said arcuate member being secured to the respective free end portions of said U-shaped spring member, and further including mounting means coupled to one of said free end portions of said spring member to bias said arcuate member toward said capstan means.

7. Apparatus for use with a system for transporting an elongated recording web including rotatable capstan means having a substantially cylindrical peripheral surface adapted to cooperate with a first side of said recording web, a covering of a first material disposed on and affixed to the peripheral surface of said capstan means, said first material having a given coefficient of friction for producing between said capstan means and said first side of said recording web a high value friction force upon contact therebetween, non-rotatable guide means stationary with respect to the direction of movement of said web and including a surface adapted to cooperate with the side of said recording web opposite said first side, said guide surface including a further material exhibiting a coefficient of friction which is less than said given coefficient of friction for producing between said guide surface and said opposite recording web side a low value friction force upon contact therebetween, comprising; means for supporting said guide means in a manner to cause said guide surface to urge said first web side into cooperative relation with said capstan means with a force sufficient to produce advancement of said web between said peripheral capstan surface and said guide surface when said capstan means is rotated, said support means having rod means including resilient means mounting said guide means for movement toward and away from said capstan means and biasing said guide means toward said capstan means, and means coupling said guide means to a portion of said rod opposite said capstan means in a manner to permit rotation of said guide means transverse of the direction of movement of said web.

8. The invention according to claim 7, wherein the coefficient of friction of said first material is at least five times greater than the coefficient of friction of said further material.

9. The invention according to claim 7, wherein said first material includes polyurethane having a thickness in the range of 0.010–0.026 inches, with a hardness in the range of 50–80 as measured on a Shore A Durometer scale, and wherein said first material exhibits a coefficient of friction in the range of 1.2–2.0, with said further material exhibiting a coefficient of friction less than 0.1.

* * * * *